Patented Aug. 9, 1927.

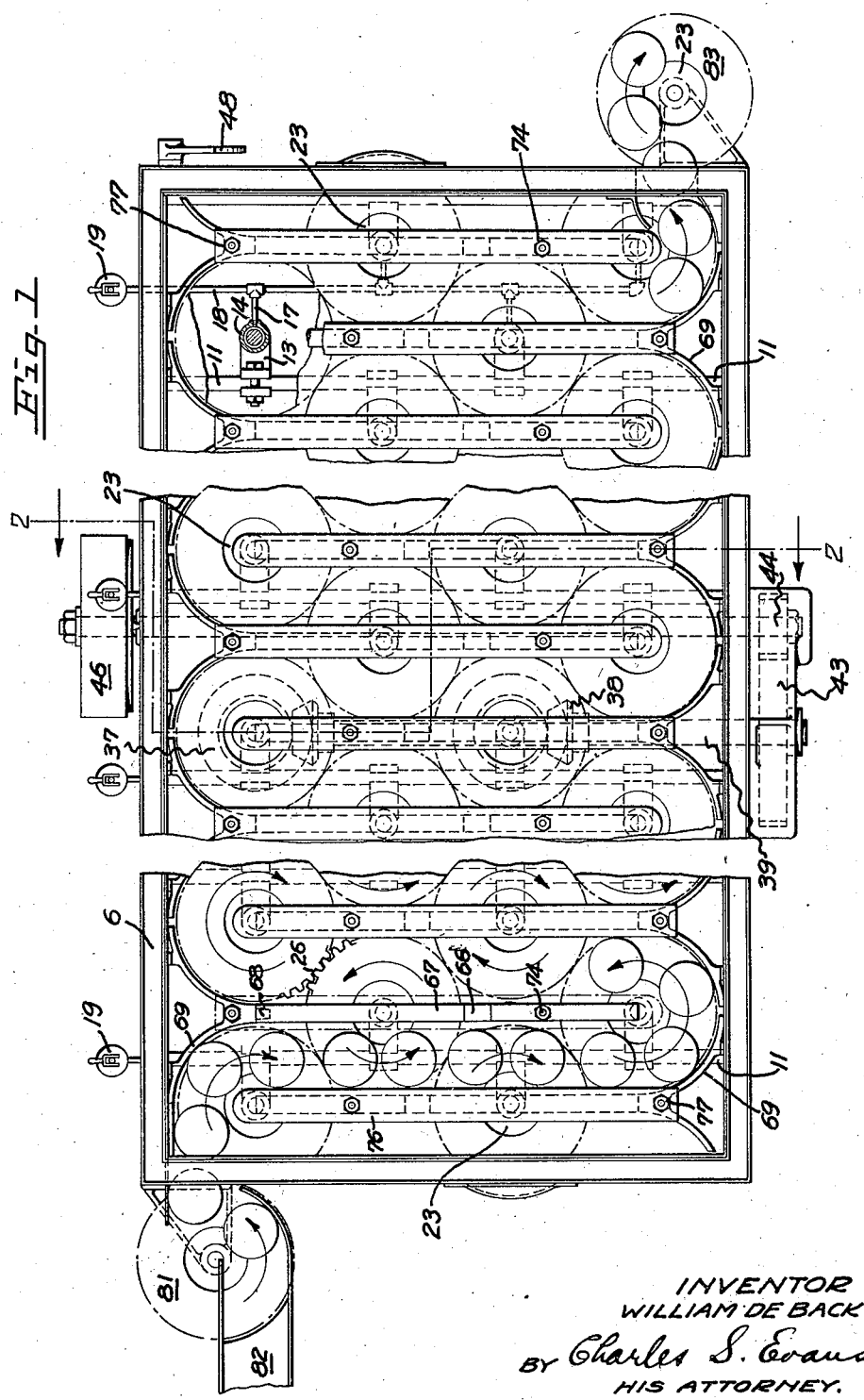

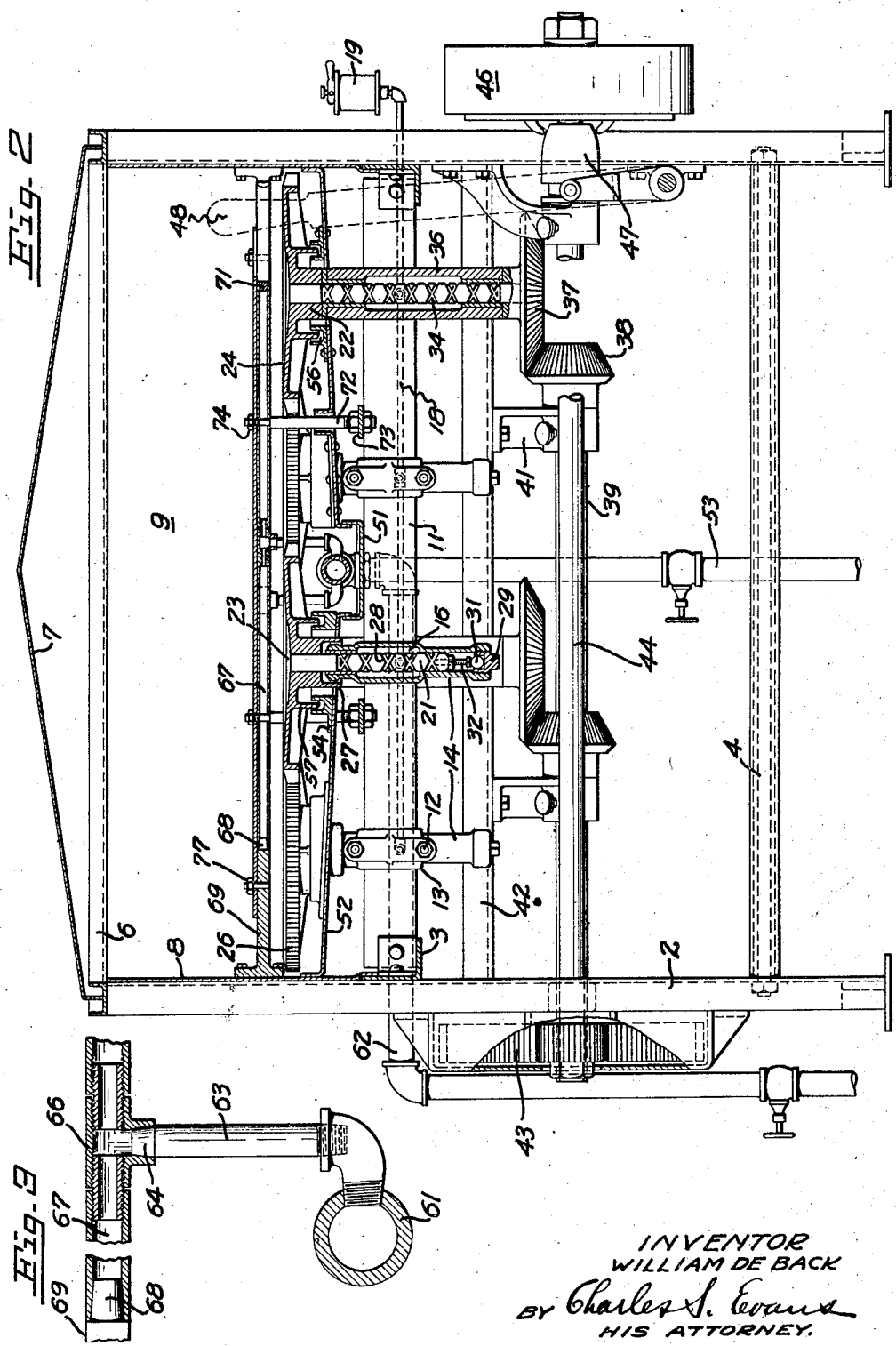

1,638,760

UNITED STATES PATENT OFFICE.

WILLIAM DE BACK, OF SAN LEANDRO, CALIFORNIA, ASSIGNOR TO SPRAGUE-SELLS CORPORATION, OF HOOPESTON, ILLINOIS, A CORPORATION OF DELAWARE.

EXHAUST BOX.

Application filed November 24, 1926. Serial No. 150,520.

My invention relates to devices used in the packing industry for heating the cans or containers after filling, and before capping, so as to exhaust the imprisoned air from the contents of the container.

One of the objects of the invention is the provision of an exhaust box having an improved form of conveyor disk, by which cans are agitated as they pass from one disk to the next.

Another object of the invention is the provision of an apparatus of the character described in which the conveyor disks are so constructed as to materially reduce the friction between the disks and the can, and to substitute a rolling motion for the sliding motion which characterizes the passage of cans over a flat top disk.

Another object of the invention is the provision of an adjustable guide structure for directing the movement of the cans over the disks, so that the apparatus may be used for widely different sizes of cans.

Another object of the invention is the provision of a guide structure which is readily removable to give access to the underlying parts.

Another object of the invention is the provision of an improved bottom structure for the chamber containing the conveyor disks, so that the chamber is tight against the escape of steam and water, and steam and water is kept out of the bearings.

My invention possesses other objects and features of advantage, some of which with the foregoing will be set forth in the following description of the preferred form of my invention, which is illustrated in the drawings accompanying and forming part of the specification. It is to be understood that I do not limit myself to the showing made by the said drawings and description as I may adopt variations of the preferred form within the scope of the invention as set forth in the claims.

Referring to the drawings:

Figure 1 is a plan view of my exhaust box, the cover being removed and portions of the structure being broken away to shorten the view.

Figure 2 is a transverse vertical section, the planes of section being indicated by the line 2—2 of Figure 1.

Figure 3 is a detail, partly in vertical section, showing the mounting of the steam distributor pipes.

Broadly considered, my exhaust box comprises a housing in which a plurality of rows of tangentially arranged carrier disks are placed. The disks provided means for conveying the cans thru the housing, and in alternate rows the disks revolve in one direction, while in the other rows the disks revolve in the opposite direction. The disks in any one row are not in mesh with each other, but with the two adjacent disks in the adjoining row. A drive shaft extending transversely across the rows below the disks is suitably geared to a disk structure, preferably in two alternate rows, so as to distribute the strain of the driving force; all of the disks then acting as a single gear train, driven by force applied at two different points in the train. The driving shaft is geared to a power shaft, driven thru suitable clutch mechanism by a pulley connected to any suitable source of power. The spacing of the disks is such that a straight line drawn between the centers of rotation of corresponding disks in alternate rows, is substantially tangent to the adjacent disks of the other rows. Steam pipes for distributing jets of steam within the housing are arranged coincident with vertical planes cutting the centers of rotation of corresponding disks in alternate rows. These distributor pipes are readily demountable to give access to the structure below, and are arranged with flush fittings, and merge smoothly into the end supporting brackets, so that both the pipes and the brackets, may serve as guides for the larger sizes of cans treated in the apparatus. When smaller sizes of cans are to be treated, the distributor pipes are overlaid with guide plates of suitable width, so that the path of travel of the cans across the exhaust box is substantially a straight line. The outer end of each distributor pipe is supported by a bracket, projecting upwardly from one of the transverse bars below the disks. These bars also serve to support the bearings in which the disks are journaled. The disks are each slightly dished and in addition are recessed about the center, so that on each disk an annular rim portion is provided with which the cans come in contact. Thus the cans are caused to rock as they pass from one disk to the next, and this rocking throws the can against the guide and causes it to roll along, the engagement with both guide and disk being a rolling one instead of a sliding one.

In detail my exhaust box comprises a frame work including legs 2, suitably connected by rails 3 and cross ties 4. A channel 6 runs around the top of the frame so as to provide a seat for the cover 7, and the sides of the frame from the channel 6 down to the rail 3, are filled in with plates 8 which form the side walls of the exhaust chamber 9. Spaced transversely across the frame at suitable intervals are bars 11, which preferably are of rectangular section, and which are secured in the side frame members in any suitable way. Firmly clamped on the bars 11 by the bolts 12, are the brackets 13, each of which is preferably integrally formed with a vertical bearing box 14. The brackets alternate on each side of the bars and in the present embodiment of my invention, there are four brackets on each bar, although I may use six or even eight. Each bearing box 14 is formed with a chamber 16, intermediate its ends; and each chamber is connected by a short pipe 17, with a feed pipe 18 extending to the side of the exhaust box and terminating in an oil cup 19. Preferably one feed pipe and oil cup is provided for each four bearings extending in staggered relation transversely across the machine.

Journaled in each bearing box is a shaft 21, on the upper end of which is fixed the carrier disk 22, slightly dished or concave as shown in Figure 2, and having a recess 23 in its central portion so that an annular carrier rim portion 24 is provided on each disk. Each disk is further provided on its periphery with the spur gear teeth 26, preferably beveled slightly on the upper side.

Depending from the top of each disk is an annular flange 27, enclosing the upper end of the bearing, so that water splashed or condensed on the disk cannot enter the bearing. A spiral groove on the shaft carries lubricant over the shaft. The lower end of the bearing box is closed by the plug 29, in which is seated the ball 31; and a set screw 32, adjustable in the lower end of the shaft, rests on the ball. There is thus provided a substantially frictionless adjustable thrust bearing at the lower end of each shaft.

Since all the disks are connected, driving one disk will drive the entire train, but in order to distribute the stress, I prefer to drive at two points. Two of the disks are mounted on shafts 34 which extend downwardly thru the bearing boxes 36. A bevel gear 37 is fixed on the bottom of each shaft 34, and is in mesh with a driving pinion 38 on the drive shaft 39. The drive shaft is journaled in suitable hanger brackets 41, mounted on the cross piece 42. The driving shaft 39 is connected by the gears 43 with the power shaft 44, provided at the opposite end with the pulley 46 connected in the usual way to any suitable source of power. A clutch 47 controlled by the handle 48 is interposed between the pulley 46 and the power shaft.

Supported on the cross bars 11 and extending longitudinally in the center of the machine is a channel 51, into which the sloping bottom 52 on each side drains. The channel 51 is sloped slightly towards one end or from each end towards the center; and at the low point is provided with a valved drain pipe 53 thru which the water of condensation may escape.

In order to further protect the bearings from the effect of steam and water, I mount on the bottom 52, around each of the disk hubs a ring 54, formed with an annular groove 56, into which extends an apron or flange 57, pendant from the lower face of the disk. During use of the apparatus, water of condensation will collect in each of the grooves so as to form a water seal, completely shutting off the bearing and preventing the escape of steam out of the chamber 9.

Extending longitudinally of the exhaust box and lying within the channel 51, is a steam pipe 61 supplied thru the pipe 62 with steam from any suitable source. On each side of the steam pipe 61, and spaced at suitable intervals therealong are vertical branch pipes 63 each ending in a conical stud end 64, adapted to be seated in the complementary socket in the T 66, forming part of the distributor pipe 67. One end of each distributor pipe 67 is also provided with a coned socket, complementary to a stud 68, carried on a curved guide bracket 69, secured to the side wall 8 of the exhaust box. The opposite end of the pipe is closed with a plug 71, and it will be noted that the outer surface of the pipe is flush and that it merges smoothly into the guide bracket supporting the end. This is because the distributor pipes also function as guide rails for gallon size cans. Each distributor pipe is held in position on its two studs by a bracket 72, which extends upwardly between the disks and is supported from a plate 73, secured to the cross pieces 11. The upper end of each bracket 72 is reduced in size to form a supporting shoulder and so that it is adapted to pass thru a suitable aperture in the pipe, and is threaded to receive the nut 74. From the above it will be seen that by loosening the nut 74 from the top of each of the steam pipes, the pipes may be lifted off of their supporting studs to give access to the underlying structure.

In order to impart a desired rolling motion to the cans passing thru the box, I prefer to have the path thru which the cans travel, but a small amount wider than the diameter of the can. When sizes of cans smaller than the gallon size are to be exhausted I provide flat guide rails, to be applied over the distributor pipes, so that the can track is correspondingly narrowed. As the cans pass from one disk to the next, the dished carrier rim causes them to tip toward the center of the disk and against the guide rail overlying that center. Since the can path is but little wider than the diameter of the cans, the can is then supported on one side by the rail and on the opposite side by a small portion of the bottom edge resting on the disk. In this position rotation of the disk causes the can to roll along to the next disk, where it tips in the opposite direction against the opposite guide rail with reversal of its rolling motion. This tipping and rolling produces a mild agitation in the contents of the can so that the process of exhaustion of the imprisoned air is facilitated. In Figure 1 of the drawings, the second distributor pipe from the left of the figure is shown without the overlying guide rail, but each of the other distributor pipes is shown with a guide rail 76 overlying it and held in place by the nuts 74 and 77, the latter of which is threaded over a suitable stud mounted in the guide bracket 69. With each exhaust box various widths of guide rails 76 are furnished and it is the work of but a few moments to apply the width of guide rails suitable for a given size of can. It will be noted that the distributor pipes 67 extend transversely across the chamber 9 a short distance above the surface of the carrier disks, and that each is coincident with a vertical plane determined by the axes of rotation of corresponding disks in alternate rows. It is also to be noted that the distributor pipes merge into guide brackets alternately on opposite sides of the exhaust box, and that the free end of each distributor pipe terminates over the center of the disk opposite the bracket on which it is supported.

At one end of the exhaust box a feed disk 81 is arranged, on which the entering cans are taken from the chute 82; and at the opposite end, a discharge disk 83 carries the treated cans forward to the next step in the canning process. From the above it will be clear that with the cover 7 removed, the guide rails and distributor pipes may be readily demounted. With these out of the way, the individual disks are accessible from the top and may be lifted out of their bearings, for inspection, repair or replacement.

I claim:

1. In a disk conveyor, a disk having an annular carrier portion and a recessed central portion.

2. A conveyor disk having a dished annular carrier portion and a recessed central portion.

3. A conveyor comprising a plurality of tangentially arranged disks, each disk having a dished annular rim surrounding a recessed central portion.

4. A conveyor for cylindrical objects comprising a plurality of tangentially arranged disks, each disk having a dished annular rim surrounding a recessed central portion, and guide rails for maintaining the objects in such position that only part of the base periphery of the object is engaged by the rim.

5. A conveyor for cylindrical objects comprising a plurality of rows of tangentially arranged disks, each disk having a dished annular rim surrounding a recessed central portion, means for rotating the disks in alternate rows in one direction and in the other rows in the opposite direction, and means disposed adjacent said disks to guide the objects thereon from a disk in one row to the adjoining disk in the next row.

6. In an exhaust box, a carrier disk, a shaft on which said disk is fixed, means providing an annular recess adapted to hold liquid and surrounding the shaft, and an annular flange on said disk extending into said recess.

7. In an exhaust box, a casing having a floor, a shaft extending thru the floor, a carrier disk on said shaft and within the casing, means disposed on the floor and providing an annular recess adapted to hold liquid and surrounding the shaft, and an annular flange on said disk extending into said recess.

8. An exhaust box for containers comprising a casing, a plurality of carrier disks arranged in said casing, perforated steam pipes in said casing to distribute steam therein, and plates overlying said steam pipes to guide the containers over the disks.

9. An exhaust box for containers comprising a casing, a plurality of carrier disks arranged in said casing, a steam pipe rising between the disks to a stud end, a bracket terminating in a stud end on the side of the casing, and a steam distributor pipe having sockets for said studs and arranged thereon.

10. An exhaust box for containers comprising a casing, a plurality of carrier disks arranged in said casing, a steam pipe rising between the disks to a stud end, a bracket terminating in a stud end on the side of the casing, a steam distributor pipe having sockets for said studs and arranged thereon, and means for releasably securing the distributor pipe on its studs.

11. An exhaust box for containers comprising a casing, a plurality of carrier disks arranged in said casing, a bracket on the side of the casing and a bracket rising between the disks, each bracket being provided with a stud, and a guide rail apertured to receive the studs.

12. An exhaust box for containers comprising a casing, a plurality of carrier disks arranged in said casing, a steam pipe and a bracket rising between the disks and each terminating in a stud end, a bracket terminating in a stud end on the side of the casing, a steam distributor pipe having sockets for said studs and arranged thereon, and means on the stud of the first named bracket for retaining the distributor pipe on the other two studs.

13. An exhaust box for containers comprising a casing, a plurality of carrier disks arranged in said casing, a steam pipe and a bracket rising between the disks and each terminating in a stud end, a bracket terminating in a stud end on the side of the casing, a steam distributor pipe having sockets for said studs and arranged thereon, means on the stud of the first named bracket for retaining the distributor pipe on the other two studs, and a guide rail overlying the distributor pipe.

14. In an exhaust box, a casing, bars extending across said casing, a channel supported on said bars, floor sections sloping from each side of the casing to the channel, bearing boxes on said bars, shafts on said boxes and extending thru said floor sections, carrier disks arranged on said shafts and means to provide a liquid seal interposed between each shaft and the floor.

In testimony whereof, I have hereunto set my hand.

WILLIAM DE BACK.